US006318352B1

United States Patent
Gnazzo et al.

(12)

(10) Patent No.: US 6,318,352 B1
(45) Date of Patent: Nov. 20, 2001

(54) DUST AND PARTICLE CONTROL ATTACHMENT FOR A SAW

(76) Inventors: Michael Gnazzo, 70 Lake Rd., Columbia, CT (US) 06237; Robert W. White, 61 W. Shore Dr., Bloomingdale, NJ (US) 07403

(*) Notice: Subject to any disclaimer, the term of this patent is extended or adjusted under 35 U.S.C. 154(b) by 0 days.

(21) Appl. No.: 09/570,865

(22) Filed: May 15, 2000

(51) Int. Cl.$^7$ ........................................................ B28D 1/02
(52) U.S. Cl. ................ 125/12; 30/124; 30/388; 30/390; 30/514; 30/516; 125/13.01; 125/13.02
(58) Field of Search .................... 30/124, 388, 390, 30/514, 516; 125/12, 13.01, 13.02

(56) References Cited

U.S. PATENT DOCUMENTS

| 4,022,182 | * | 5/1977 | Lenkevich | 125/13 R |
| 4,414,743 | * | 11/1983 | Pioch et al. | 30/124 |
| 4,876,797 | * | 10/1989 | Zapata | 30/388 |
| 5,327,649 | * | 7/1994 | Skinner | 30/124 |

* cited by examiner

Primary Examiner—Joseph J. Hail, III
Assistant Examiner—Shantese McDonald
(74) Attorney, Agent, or Firm—Alfred C. Hill

(57) ABSTRACT

A dust and particle control attachment for a saw having a housing and a rotary blade secured for rotation on a shaft extending from the housing comprising a rotary blade guard enclosing a portion of the rotary blade having one side thereof secured to the housing and the other side thereof removably secure to the one side to form a passageway for dust and particles produced during a cutting operation, the passageway having an intake end and a discharge end, a first arrangement is associated with at least one of the side and the other side of the rotary blade guard adjacent the intake end of the passageway to enable cutting inside corners of walls disposed at a predetermined angle with respect to each other both horizontally and vertically, and a second arrangement associated with at least one of the one side and the other side of the rotary blade guard to contain the dust and particles within the passageway and to direct the dust and particles to a collection means connected to the rotary blade guard adjacent the discharge end of the passageway.

20 Claims, 5 Drawing Sheets

US 6,318,352 B1

DUST AND PARTICLE CONTROL ATTACHMENT FOR A SAW

BACKGROUND OF THE INVENTION

The present invention relates to saws and more particularly to a dust and particle control attachment for rotary blade saws.

In any sawing or grinding operation employing a disk-shaped or circular rotary saw blade or rotatable grinding element, a considerable quantity of dust is produced as a rotatable element cuts or grinds through the material being sawed or ground. The volume and nature of the dust produced presents a particular problem in sawing stone, concrete or mortar.

At one time, the dust generated by sawing concrete with a rotary saw blade was controlled by directing a flow of water to the saw blade so as to both cool the saw blade and carry away the particulates of concrete or mortar dust generated as the saw cuts through the concrete or mortar. This necessitated a supply of water to the location at which the concrete or mortar was to be cut. In some locations, it is extremely difficult to provide a cooling water supply for a rotary saw blade used for cutting concrete or mortar. For example, mortar is often cut from between bricks on the side of a building for preparation of tuck pointing the bricks where the mortar has begun to crack and loosen. On tall buildings especially, it is extremely difficult to provide a cooling water supply to a concrete saw being used to saw out cracked mortar from between bricks.

In recent years, the cutting of mortar and concrete has been performed with power saws employing blades containing diamond cutting elements. Such implements are very advantageous since no cooling water supply is required where diamond tipped rotary blades are utilized. However, one major disadvantageous of the elimination of cooling water is the large amount of very fine dust generated during the sawing operation. The immediate environment of an individual operating the saw is filled with this very fine dust. The operator must therefore wear a mask to attempt to keep the dust out of his nose, mouth and lungs. Such masks are only partially effective, however. Furthermore, the clouds of dust generated reduce the operators' visibility, thereby slowing the pace at which the concrete can be cut.

As OSHA standards become tougher on free silica, contractors who cut masonry and other dust producing materials (sheetrock, other gypsum products, etc.) are forced to protect their workers and surrounding people from the dust hazard both on external and internal worksites.

In the past, it has been the focus of the people in the masonry grinding business or cutting business to focus on personal protective systems and gear for their employees. Dust was just one of the many hazards to deal with. The most effective system was a dust respirator developed for the mining industry. This worked well for many years. Then it was realized that even though the respirator protected the lungs from dust during cutting operations the residue dust that collected on clothing and the surrounding work environment was also a hazard.

Efforts were then made to contain the dust at the source. There are several manufacturers that provide a large selection of well engineered dust containment systems for both cutting and surface grinding. All of the products that have been used in the past fail to enable the cutting of the inside corner of abutting walls. It would be an advantage if the inside corners of abutting walls could be cut and ground in the same operation as the rest of the wall particularly on historical buildings with lots of moldings and ornamental detail.

SUMMARY OF THE INVENTION

An object of the present invention is to provide an improved dust and particle control attachment for a rotary blade saw.

Another object of the present invention is to provide a dust and particle control attachment for a saw having a rotary blade which also enables the cutting of inside corners of abutting walls.

A feature of the present invention is the provision of a dust and particle control attachment for a saw having a housing and a rotary blade secured for rotation on a shaft extending from the housing comprising a rotary blade guard closing a portion of rotary blade having one side thereof secured to the housing and the other side thereof removably secured to the one side to form a passageway for dust and particles during a cutting operation, the passageway having an intake and a discharge end; first means associated with at least one of the one side and the other side of the rotary blade guard adjacent the intake end of the passageway to enable cutting inside corners of walls disposed at a predetermined angle with respect to each other both horizontally and vertically; and second means associated with at least one of the one side and the other side of the rotary blade guard to contain the dust and particles within the passageway and to direct the dust and particles to a collection means connected to the rotary blade guard adjacent the discharge end of the passageway.

BRIEF DESCRIPTION OF THE DRAWING

Above-mentioned and other features and objects of the present invention will become more apparent by reference to the following description taken in conjunction with the accompanying drawing, in which.

DESCRIPTION OF THE PREFERRED EMBODIMENTS

Figure 1:
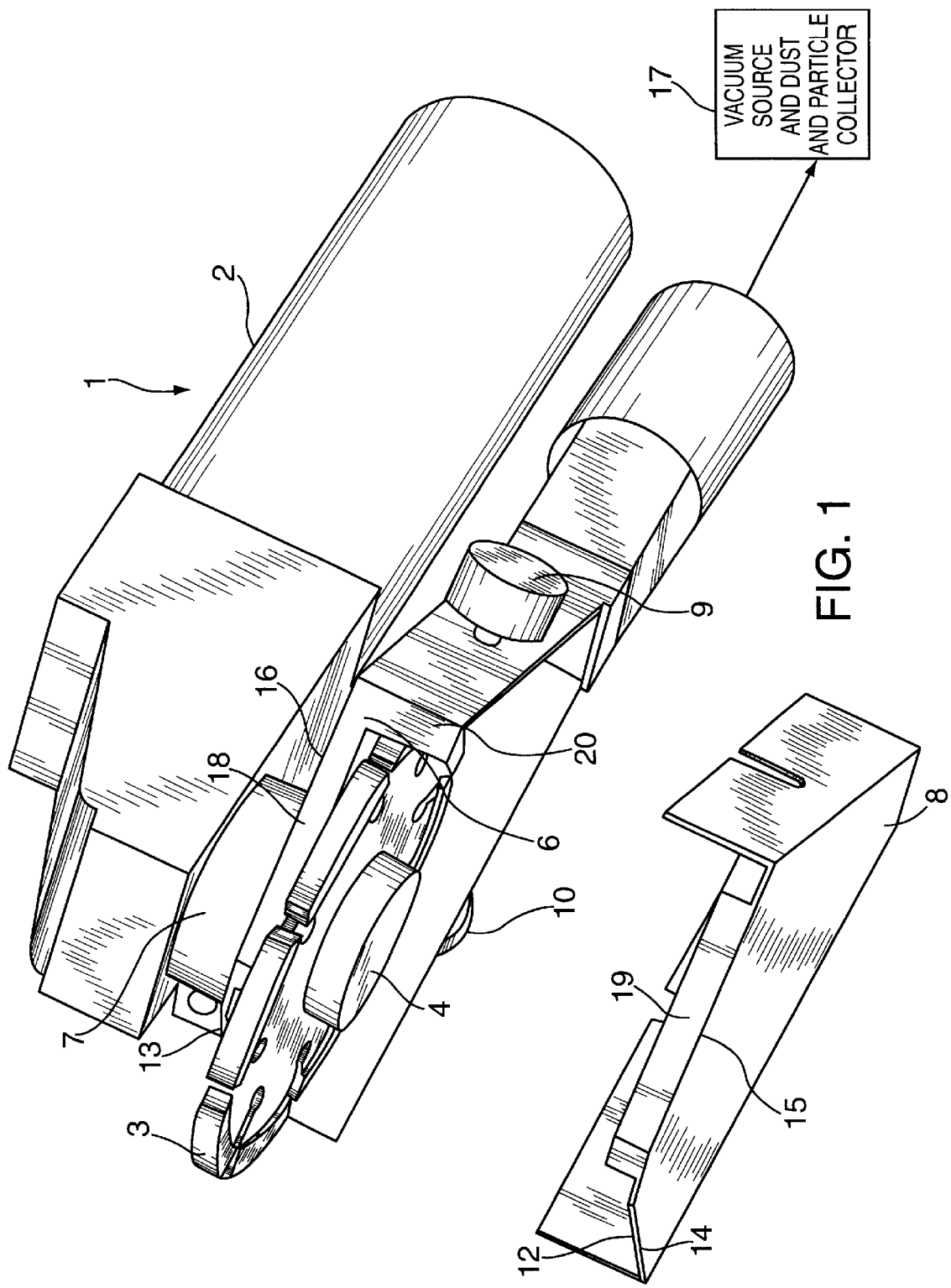
FIG. 1 is an exploded perspective view of one embodiment of dust and particle control attachment for a cutting saw in accordance with the principles of the present invention.
Figure 2:
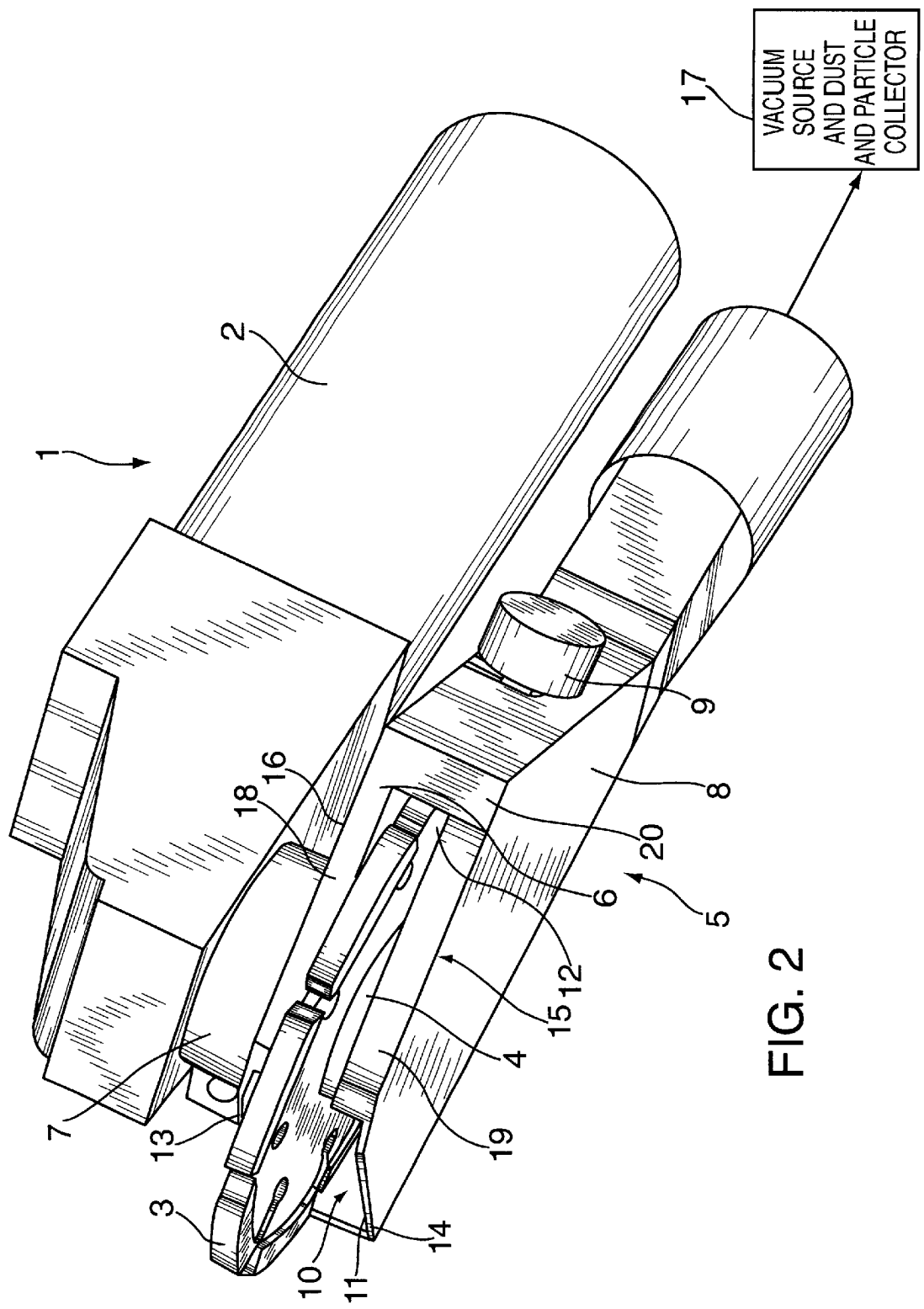
FIG. 2 is an assembled perspective view of the embodiment of FIG. 1.

Referring to FIGS. 1 and 2, there is illustrated therein a dust and particle control attachment for a saw 1 having a housing 2 and a rotary blade 3 secured for rotation on a shaft 4 extending from housing 2. The saw 1 may be a masonry saw that is used to remove the mortar between bricks in a wall to enable tuck pointing bricks where the mortar has begun to crack and loosen. It should be obvious that the saw 1 should be a portable saw and is hand held by the operator. The blade 3 would preferably have diamond cutting elements to assist in the removing of the concrete and mortar.

Blade guard 5, which encloses portion of the blade 3, include one side 6 thereof secured to housing 2 by clamp 7 which is clamped to a circumferential portion of housing 1 containing shaft 4. Blade guard 5 further includes another side 8 which is removably secured to side 6 by the thumb screws 9 and 10. The sides 6 and 8 form a passageway for dust and particles produced during a cutting operation. Passageway 10 has an intake end 11 and a discharge end 12.

A first means associated with at least one of the sides 6 and 8 adjacent the intake end 11 enables cutting inside corners of the walls disposed at a predetermined angle with respect to each other, both horizontally and vertically. As illustrated in FIGS. 1 and 2, this first means includes a portion 13 on side 6 and a portion 14 on side 8 adjacent intake end 11 sloping at a predetermined angle away from shaft 4 to expose a larger portion of rotary blade 3 to enable cutting the inside corners both horizontally and vertically.

In use, the saw 1 would be guided along edges 15 and 16 of sides 6 and 8, respectively, to remove the mortar between the bricks on a straight wall surface. When encountering an inside corner, the saw 1 would then be moved along portions 13 and 14 at the angle at which these portions slope away from the edges 15 and 16 so that a greater portion of blade 3 is exposed so that the inside corners both horizontally and vertically can have the mortar remove from between the bricks therein.

The attachment to control the dust and particles is further provided with a second means associated with at least one of the sides 6 and 8 to contain the dust and particles within the passageway 10 and to direct the dust and particles to a collection and vacuum source means 17 with the vacuum source and dust and particle collector 17 being attached to the guard 5 adjacent the discharge end 12 of the passageway 10.

The second means includes a first member 18 extending from side 6 toward and parallel to blade 3. A second member 19 extends from side 8 toward and parallel to blade 3 and a third member 20 shown to extend from side 6 in line with the rotary blade 3. Third member 20 alternately could extend from side 8. Members 18, 19 and 20 contain the dust and particles within the passage 10 and direct the dust and particles to the collector arrangement 17.

Figure 3:
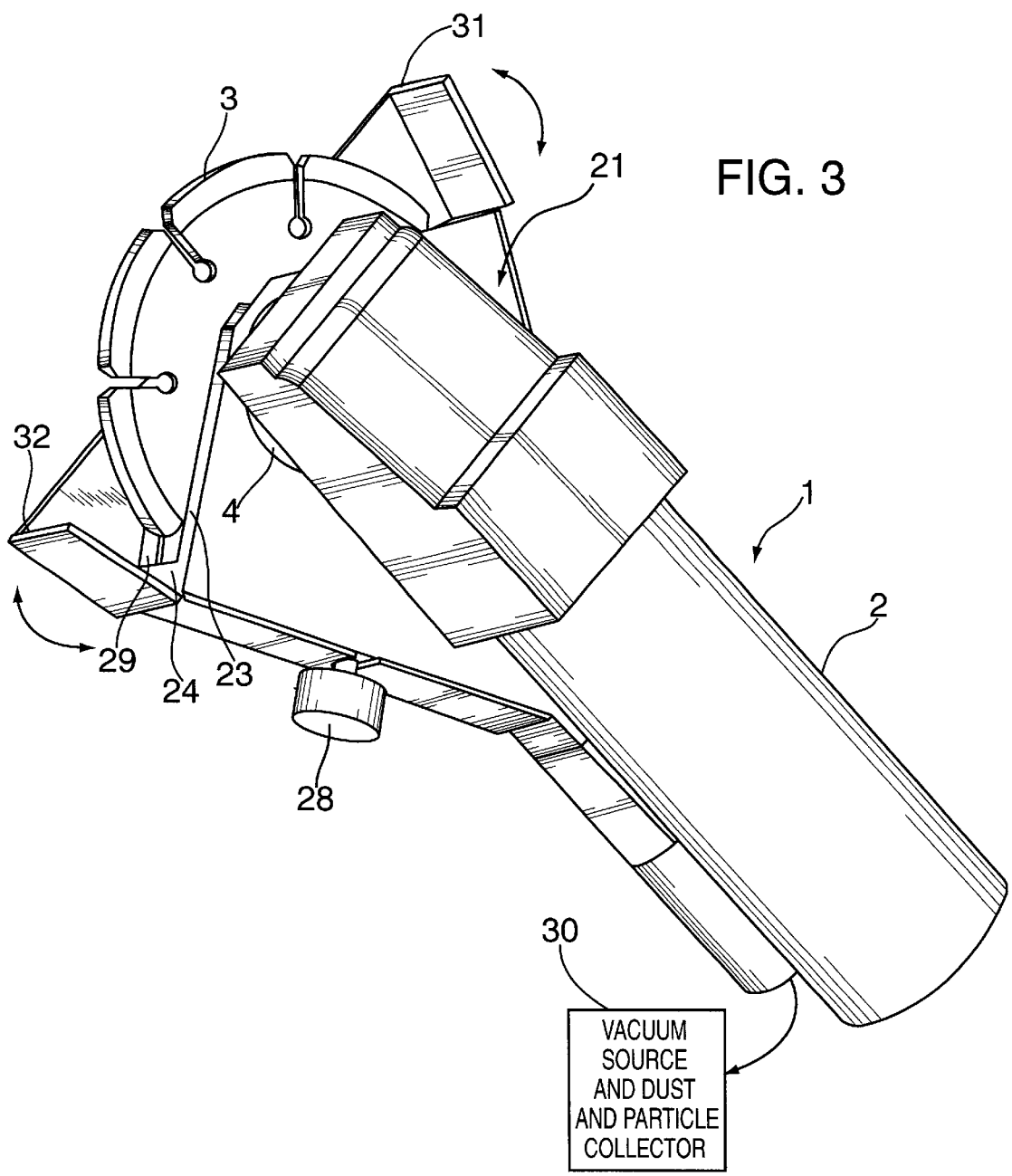
FIG. 3 is a assembled perspective view of a second embodiment of the dust and particle control attachment for a cutting saw in accordance with the principles of the present invention.
Figure 4:
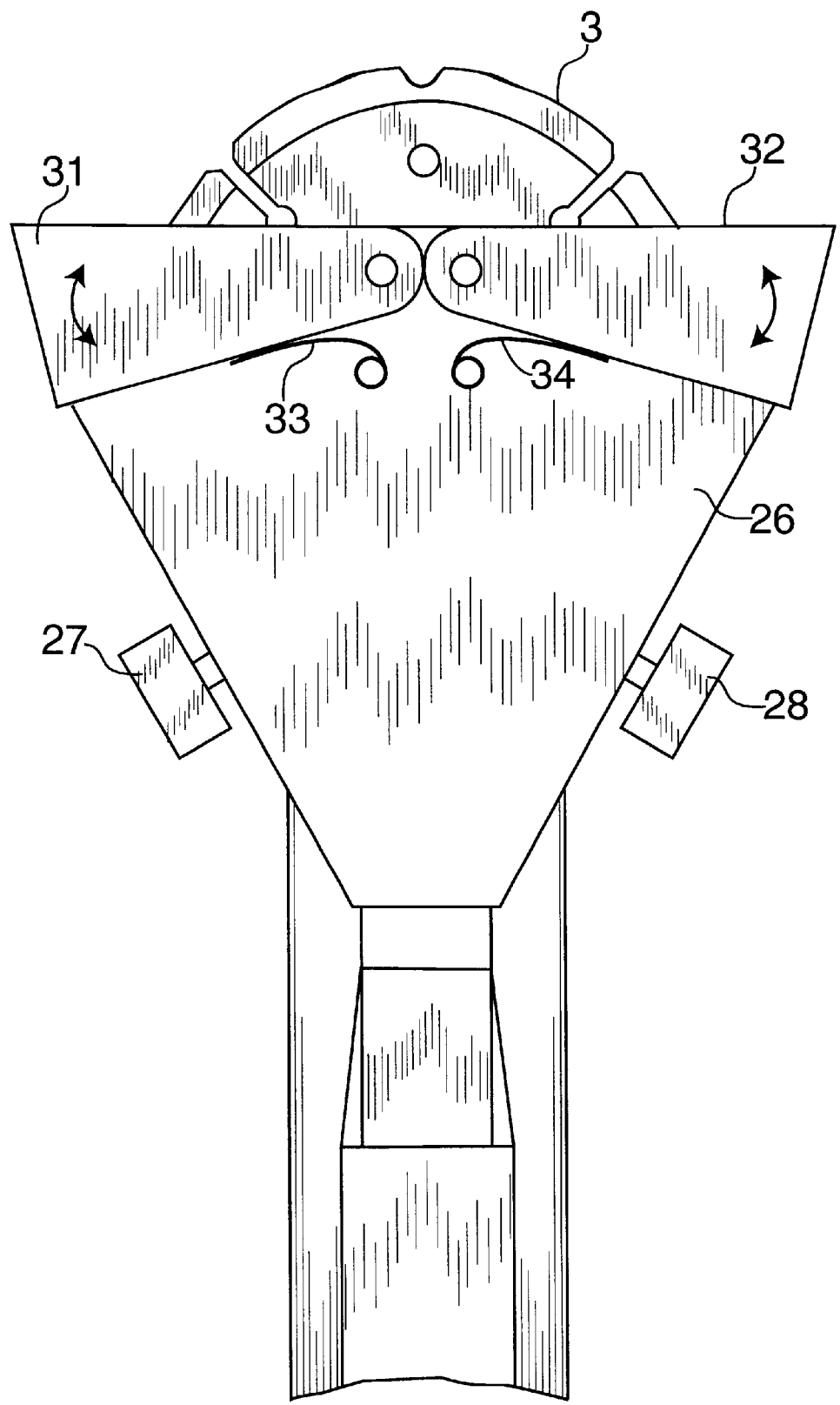
FIG. 4 is a plan view of the embodiment of FIG. 3.
Figure 5:
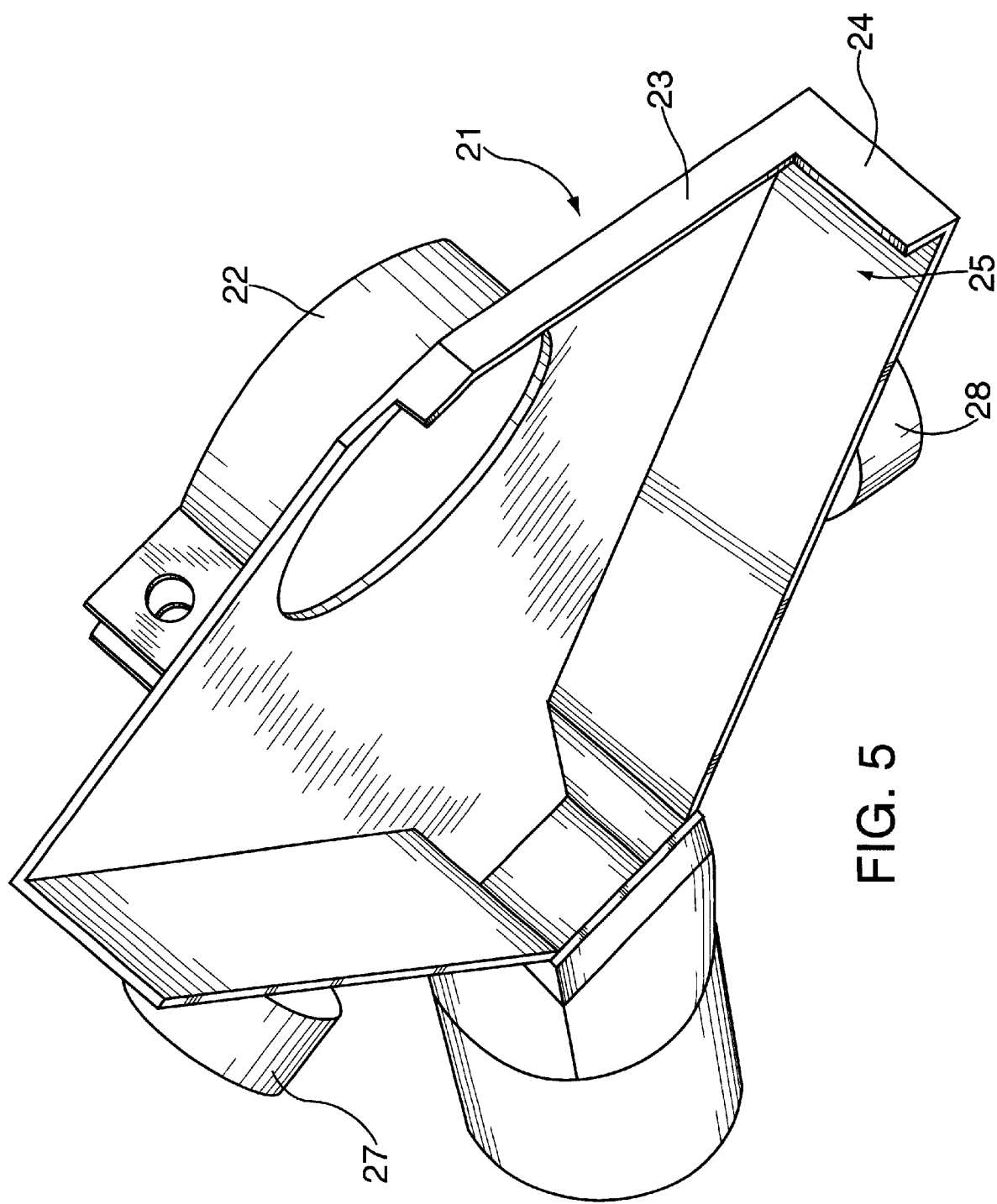
FIG. 5 is a perspective view of one side of the attachment of FIGS. 3 and 4.

Referring to FIGS. 3, 4 and 5, there is illustrated therein a second embodiment of the dust and particle control attachment for the saw 1 which includes the housing 2, the blade 3 on the shaft 4 extending from housing 2. The attachment includes a first side 21, shown more specifically in FIG. 5, having the clamp 22 to secure the attachment to the housing 1 coaxial with shaft 4. As in the embodiment of FIGS. 1 and 2, the first side 21 includes a member 23 extending from side 21 parallel to blade 3 and a member 24 in line with blade 3 to assist in confining the dust and particles, resulting from the cutting action of the blade 3, in a passageway 25. The second side 26 of the blade guard is fastened to the first side 21 by means of the thumb screws 27 and 28. Again, the second side 26 has the member 29 extending toward blade 3 and parallel to blade 3 to cooperate with members 23 and 24 to confine the dust and particles in the passageway 25 and to direct the dust and particles to vacuum the source and dust and particle collector 30.

In this embodiment the first means to enable cutting inside corners include members 31 and 32 are spring loaded by leaf springs 33 and 34, respectively, and secured to the second member 26 adjacent the intake end of the passageway 25.

In operation, the saw 1 is guided along members 31 and 32 to remove the mortar between the bricks in a continuous wall. When it is necessary to remove the mortar on an inside corner of abutting walls either one of the members 31 and 32 are pushed downward by the movement of the saw to expose a larger portion of blade 3 so that the inside corner can have the mortar removed between the bricks. One of the members 31 and 32 which is depressed by the movement of the saw 1 is determined by the direction of motion of the saw 1 into the inside corner. If you are going from right to left to an inside corner, the member 31 would be depressed to expose a greater portion of blade 3. And if you are going from left to right into the inside corner, member 32 would be depressed to expose a greater portion of the blade 3 to remove the mortar between the bricks on the inside corner. Of course, when either of the members 31 and 32 are depressed, the springs 33 and 34 return these members to their original position after removing the mortar on the inside corner.

The embodiment of FIGS. 3 to 5, can be further modified by employing only one of the members 31 and 32 as long as a surface is provided on the second side 26 to replace the surface of the omitted one of members 31 and 32.

Both of the embodiments disclosed herein must use a high performance vacuum to work effectively and the attachment fit to existing 4 to 5 inch grinders or saws found in the marketplace. Also the attachment must be able to work with standard 4 to 5 inch dry diamond cutting blades up to ¼" thick. Further, the attachment must be light and trim enough to work without becoming too bulky.

While we have described the principles of our invention in connection with specific apparatus, it is to be clearly understood that this description is made only by way of example and not as a limitation to the scope of our invention as set forth in the objects thereof and in the accompanying claims.

We claim:

1. A dust and particle control attachment for a saw having a housing and a rotary blade secured for rotation on a shaft extending from said housing comprising:

a rotary blade guard enclosing a portion of said rotary blade having one side thereof secured to said housing and the other side thereof removably secured to said one side to form passageway for dust and particles produced during a cutting operation, said passageway having an intake end and a discharge end;

first means associated with at least one of said one side and said other side of said rotary blade guard adjacent said intake end of said passageway to enable cutting inside corners of walls disposed at a predetermined angle with respect to each other both horizontally and vertically; and second means associated with at least one of said one side and said other side of said rotary blade guard to contain said dust and particles within said passageway and to direct said dust and particles to a collection means connected to said rotary blade guard adjacent said discharge end of said passageway.

2. An attachment according to claim 1, wherein said one side of said rotary blade guard includes a clamp to secure said rotary blade guard to a circumferential portion of said housing containing said shaft.

3. An attachment according to claim 2, wherein said first means includes a portion of said one side and said other side of said rotary blade guard adjacent said intake end of said passageway sloping at a predetermined angle away from said shaft to expose a larger portion of said rotary blade to enable cutting said inside corners both horizontally and vertically.

4. An attachment according to claim 2, wherein said second means includes a first member extending from said one side of said rotary blade guard toward and parallel to said rotary blade, a second member extending from said other side of said rotary blade guard toward and parallel to said rotary blade, and a third member extending from one of said one side and said other side of said rotary blade guard and in line with said rotary blade, said first, second and third members containing said dust and particles within said passageway and directing said dust and particles to said collection means.

5. An attachment according to claim 2, wherein said first means includes at least one spring-loaded member secured to said other side of said rotary blade guard adjacent said intake end of said passageway to enable exposing a larger portion of said rotary blade to enable cutting said inside corners both horizontally and vertically.

6. An attachment according to claim 5, wherein said second means includes a first member extending from said one side of said rotary blade guard toward and parallel to said rotary blade, a second member extending from said other side of said rotary blade guard toward and parallel to said rotary blade, and a third member extending from one of said one side and said other side of said rotary blade guard and in line with said rotary blade, said first, second and third members containing said dust and particles within said passageway and directing said dust and particles to said collection means.

7. An attachment according to claim 2, wherein said first means includes a pair of spring-loaded members secured to said other side of said rotary blade guard adjacent said intake end of said passageway to enable exposing a larger portion of said rotary blade to enable cutting said inside corners both horizontally and vertically regardless of the direction said saw approaches said inside corners.

8. An attachment according to claim 7, wherein said second means includes a first member extending from said one side of said rotary blade guard toward and parallel to said rotary blade, a second member extending from said other side of said rotary blade guard toward and parallel to said rotary blade, and a third member extending from one of said one side and said other side of said rotary blade guard and in line with said rotary blade, said first, second and third members containing said dust and particles within said passageway and directing said dust and particles to said collection means.

9. An attachment according to claim 3, wherein said second means includes a first member extending from said one side of said rotary blade guard toward and parallel to said rotary blade, a second member extending from said other side of said rotary blade guard toward and parallel to said rotary blade, and a third member extending from one of said one side and said other side of said rotary blade guard and in line with said rotary blade, said first, second and third members containing said dust and particles within said passageway and directing said dust and particles to said collection means.

10. An attachment according to claim 1, wherein said first means includes a portion of said one side and said other side of said rotary blade guard adjacent said intake end of said passageway sloping at a predetermined angle away from said shaft to expose a larger portion of said rotary blade to enable cutting said inside corners both horizontally and vertically.

11. An attachment according to claim 10, wherein said second means includes a first member extending from said one side of said rotary blade guard toward and parallel to said rotary blade, a second member extending from said other side of said rotary blade guard toward and parallel to said rotary blade, and a third member extending from one of said one side and said other side of said rotary blade guard and in line with said rotary blade, said first, second and third members containing said dust and particles within said passageway and directing said dust and particles to said collection means.

12. An attachment according to claim 1, wherein said second means includes a first member extending from said one side of said rotary blade guard toward and parallel to said rotary blade, a second member extending from said other side of said rotary blade guard toward and parallel to said rotary blade, and a third member extending from one of said one side and said other side of said rotary blade guard and in line with said rotary blade, said first, second and third members containing said dust and particles within said passageway and directing said dust and particles to said collection means.

13. An attachment according to claim 1, wherein said first means includes at least one spring-loaded member secured to said other side of said rotary blade guard adjacent said intake end of said passageway to enable exposing a larger portion of said rotary blade to enable cutting said inside corners both horizontally and vertically.

14. An attachment according to claim 13, wherein said second means includes a first member extending from said one side of said rotary blade guard toward and parallel to said rotary blade, a second member extending from said other side of said rotary blade guard toward and parallel to said rotary blade, and a third member extending from one of said one side and said other side of said rotary blade guard and in line with said rotary blade, said first, second and third members containing said dust and particles within said passageway and directing said dust and particles to said collection means.

15. An attachment according to claim 1, wherein said first means includes a pair of spring-loaded members secured to said other side of said rotary blade guard adjacent said intake end of said passageway to enable exposing a larger portion of said rotary blade to enable cutting said inside corners both horizontally and vertically regardless of the direction said saw approaches said inside corners.

16. An attachment according to claim 15, wherein
said second means includes
- a first member extending from said one side of said rotary blade guard toward and parallel to said rotary blade,
- a second member extending from said other side of said rotary blade guard toward and parallel to said rotary blade, and
- a third member extending from one of said one side and said other side of said rotary blade guard and in line with said rotary blade, said first, second and third members containing said dust and particles within said passageway and directing said dust and particles to said collection means.

17. An attachment for a power tool having a cutting blade mounted relative to a housing for rotation on a shaft extending outwardly from said housing comprising:
- a guard having a first side adjacent to and fastened to said housing parallel to one side of said cutting blade and a second side spaced from said first side parallel to the other side of said cutting blade, said second side being removably fastened to said first side and cooperating with said first side to provide a passageway to capture dust and particles resulting from a cutting action of said cutting blade;
- first means associated with at least one of said first and second sides to enable cutting inside corners of abutting walls both horizontally and vertically; and
- second means associated with at least one of said first and second sides and said passageway to contain said dust and particles in said passageway and to direct said dust and particles to a collection means connected to said guard adjacent a discharge end of said passageway.

18. An attachment according to claim 17, wherein
said first means includes
- a portion of said first and second sides of said guard adjacent an intake end of said passageway sloping at a predetermined angle away from said shaft to expose a larger portion of said cutting blade to enable cutting said inside corners both horizontally and vertically.

19. An attachment according to claim 17, wherein
said first means includes
- at least one spring-loaded member secured to said second side adjacent an intake side of said passageway to enable exposing a larger portion of said cutting blade to enable cutting said inside corners both horizontally and vertically.

20. In a saw having a housing, a rotary shaft extending from said housing and a cutting blade attached to said rotary shaft, a dust and particle control attachment comprising:
- a guard for said cutting blade having a first side adjacent to and fastened to said housing parallel to one side of said cutting blade and a second side spaced from and removably fastened to said first side parallel to the other side of said cutting blade, said first and second sides cooperating to provide a passageway to capture dust and particles resulting from a cutting action of said cutting blade;
- first means associated with at least one of said first and second sides to enable cutting inside corners of abutting walls both horizontally and vertically; and
- second means associated with at least one of said first and second sides and said passageway to contain said dust and particles in said passageway and to direct said dust and particles to a collector means connected to said guard adjacent a discharge end of said passageway.

* * * * *